Figure 1:

W. M. CARTER.
CELLULAR SHEET DISPLAY.
APPLICATION FILED NOV. 19, 1919.

1,368,483.

Patented Feb. 15, 1921.

Inventor;
Willis M. Carter,
By Wilbur M. Stone
his Attorney.

UNITED STATES PATENT OFFICE.

WILLIS M. CARTER, OF NEW YORK, N. Y.

CELLULAR-SHEET DISPLAY.

1,368,483.  Specification of Letters Patent.  Patented Feb. 15, 1921.

Application filed November 19, 1919. Serial No. 339,084.

*To all whom it may concern:*

Be it known that I, WILLIS M. CARTER, a citizen of the United States, and a resident of New York, borough of Manhattan, in the county of New York and State of New York, have invented certain new and useful Improvements in Cellular-Sheet Displays, of which the following is a specification.

This invention relates to cellular sheet material structures of irregular contour and has for its object to provide an article of the class specified particularly adapted for use as an advertising display, and which on account of its lightness in weight, rigidity and low cost compared with solid cardboard renders it highly useful and advantageous. A further advantage lies in the fact that said cellular sheet material may be creased and folded without injury to printed matter carried on either or both faces thereof and that said display may therefore be creased and bent so as to permit the display to stand without extraneous support, and may be folded into a minimum area for shipping.

Heretofore in folding displays having a solid cardboard body, it has been necessary to cut the several members of the display apart and then hinge those members together by means of gummed tape or by sewing. In this procedure the original members of any one display are not always assembled together, but often one piece of one display is hinged to a piece of another display, resulting often in lack of equal color or tone in the assembled display. By my improvements these objections are obviated, as, with my unitary folding display, any one sheet of design is kept intact.

With these ends in view, and others which will appear later herein, my improvements comprise features illustrated in one of their embodiments and which may be the preferred embodiment, in the drawing accompanying this specification, wherein:—

Figure 2:
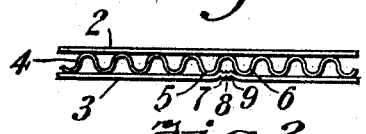
Figure 3:
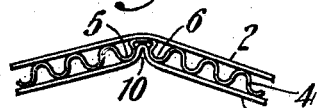
Figure 6:
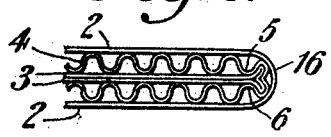
Figure 4:
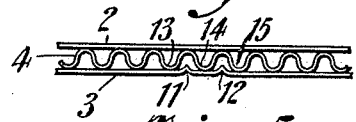
Figure 5:
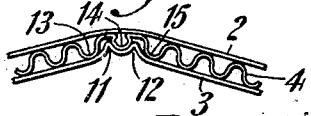

Figure 1 is an elevation in perspective of a display embodying my improvements. Fig. 2 is a fragmentary top edge view of what is shown in Fig. 1. Fig. 3 is a view similar to that of Fig. 2 but showing the cellular sheet bent along certain score lines. Fig. 4 is another view similar to that of Fig. 2 but showing a modification of the arrangement of the score lines. Fig. 5 shows the sheet of Fig. 4 bent along its score lines, and Fig. 6 shows said sheet folded upon itself for shipping purposes. The scale of Figs. 2 to 6 inclusive is equal and somewhat larger than the scale of Fig. 1.

The showing of Fig. 1 is an arbitrary selection of a display of irregular outline adapted to illustrate the general scope of my improvements. Such outline may obviously vary according to the requirements of the particular design to be produced as a cut-out. Said outline may be cut with a suitable cutting-die which will produce clean cut edges without crushing the cellular structure of the sheet material. Said cellular sheet material may be of well known character comprising two flat sheets 2 and 3 with a corrugated sheet 4 therebetween, cemented to said sheets 2 and 3 at its lines of contact therewith. Or, said cellular sheet material may comprise only one face sheet, as 2, to which the corrugated sheet 4 is attached at its lines of contact therewith, sheet 3 being omitted. It will be noted that in the illustrated form of the structure the projecting parts are formed wherever the design calls for them irrespective of the direction in which the corrugations run. The cellular structure is efficient to sustain these projections efficiently and my improvements therefore permit of a wide range of design and outline of cut-out. It will be understood, however, that I do not limit myself to any particular construction of cellular sheet material and that the character of the cellular sheet material herein illustrated represents one well known variety of the general class. In Figs. 2 and 3 is shown one type of fold which I have found efficient. Therein face sheet 3 is scored in parallelism with the corrugations of mid-sheet 4 and between two adjacent lines of contact 5 and 6 of said sheet 4 with sheet 3. Said score lines are preferably three in number, 7, 8 and 9, but the center score line 8 may be omitted in some cases. Thus, when folded, as in Fig. 3, said sheet 3 folds into a loop 10 within the groove of mid-sheet 4 between ribs 5 and 6. In the showing of Figs. 4, 5 and 6 is illustrated suitable creasing to permit the folding of the cellular sheet upon itself. Therein creases 11 and 12 are formed in sheet 3 in parallelism with the corrugations of sheet 4; crease 11 being located midway between adjacent lines of contact 13 and 14 of mid-sheet 4 with sheet 3, and crease 12 being located midway between adjacent lines of contact 14 and 15 of said mid-sheet and sheet 3. So that when said cellular board is folded from the showing of Fig. 4 through that of Fig. 5 to that of Fig. 6, rib 14 of the mid-sheet is pressed back and sheet 2 folds in an unbroken clean curve at 16, Fig. 6. It will thus be seen that there is provided a unitary folding cellular display in which the hinge is a unitary part of the whole.

I claim:

1. A display device comprising a sheet of cellular construction of irregular contour including two face sheets, a corrugated sheet therebetween, and score lines in one of said face sheets parallel with the corrugations in the mid-sheet, whereby said display may be folded upon itself along said score lines without injuring said face sheets and afterward opened out in a flat sheet for display.

2. A folding display device comprising a sheet of cellular construction including two face sheets and a corrugated sheet therebetween and having a score line in one of said face sheets parallel with the corrugations in the mid-sheet and between two adjacent lines of contact of the mid-sheet and the scored face sheet, whereby said display may be folded upon itself along said score lines without injuring said face sheets and afterward opened out in a flat sheet for display.

3. A folding display device comprising a sheet of cellular construction including two face sheets and a corrugated sheet therebetween and having two score lines in one of said face sheets parallel with said corrugations in the mid-sheet, each score line lying between two adjacent lines of contact of the mid-sheet and the scored face sheet, said two score lines being on opposite sides and contiguous to one line of contact of said mid-sheet and the scored face sheet, whereby said display may be folded upon itself along said score lines without injuring said face sheets and afterward opened out in a flat sheet for display.

In witness whereof, I hereby affix my signature this 18th day of November, 1919.

WILLIS M. CARTER.